(12) United States Patent
Jia et al.

(10) Patent No.: US 12,005,802 B1
(45) Date of Patent: Jun. 11, 2024

(54) BILEVEL COORDINATED OPTIMIZATION METHOD FOR FIXED AND MOBILE CHARGING FACILITIES ON HIGHWAYS

(71) Applicant: Tianjin University, Tianjin (CN)

(72) Inventors: Hongjie Jia, Tianjin (CN); Kecheng He, Tianjin (CN); Yunfei Mu, Tianjin (CN); Xiaodan Yu, Tianjin (CN); Xiaohong Dong, Tianjin (CN); Xiandong Xu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/391,662

(22) Filed: Dec. 21, 2023

(30) Foreign Application Priority Data

Dec. 30, 2022 (CN) .......................... 202211726231.1

(51) Int. Cl.
*B60L 53/64* (2019.01)
*G06Q 10/04* (2023.01)

(52) U.S. Cl.
CPC .............. *B60L 53/64* (2019.02); *G06Q 10/04* (2013.01); *B60L 2200/44* (2013.01)

(58) Field of Classification Search
CPC ...... B60L 53/64; B60L 2200/44; G06Q 10/04
USPC ........................................................ 708/200
See application file for complete search history.

(56) References Cited

U.S. PATENT DOCUMENTS

| | | | |
|---|---|---|---|
| 11,524,600 B2 * | 12/2022 | Treadway | ............... B60L 53/62 |
| 11,615,883 B2 | 3/2023 | Watson et al. | |
| 11,657,360 B2 | 5/2023 | Lim | |
| 11,783,435 B2 | 10/2023 | Feng et al. | |

FOREIGN PATENT DOCUMENTS

| | | | | |
|---|---|---|---|---|
| CN | 110110993 A | | 8/2019 | |
| CN | 112590598 A | * | 4/2021 | ............. B60L 53/53 |
| CN | 113869678 A | | 12/2021 | |
| CN | 113904372 B | * | 2/2024 | ............. G06Q 10/04 |

* cited by examiner

*Primary Examiner* — Tan V Mai
(74) *Attorney, Agent, or Firm* — True Shepherd LLC; Andrew C. Cheng

(57) ABSTRACT

A bilevel coordinated optimization method for fixed and mobile charging facilities on highways, includes: constructing an optimization model framework which includes an upper-layer coordinated location optimization model and a lower-layer coordinated capacity optimization model, where the upper-layer coordinated location optimization model is used to optimize locations of charging stations and determine locations and time points of charging demands that require truck mobile charger (TMC) deployment, while the lower-layer coordinated capacity optimization model is used to optimize TMC and fixed charger (FC) capacities at candidate sites, improving an utilization rate of FCs; and performing equivalent linearization on a nonlinear problem using a big-M method and converting the problem into a mixed-integer linear programming model, and implementing a data exchange process between upper and lower layers using analytical target cascading. The present disclosure enhances the utilization and flexibility of charging facilities on highways.

5 Claims, 9 Drawing Sheets

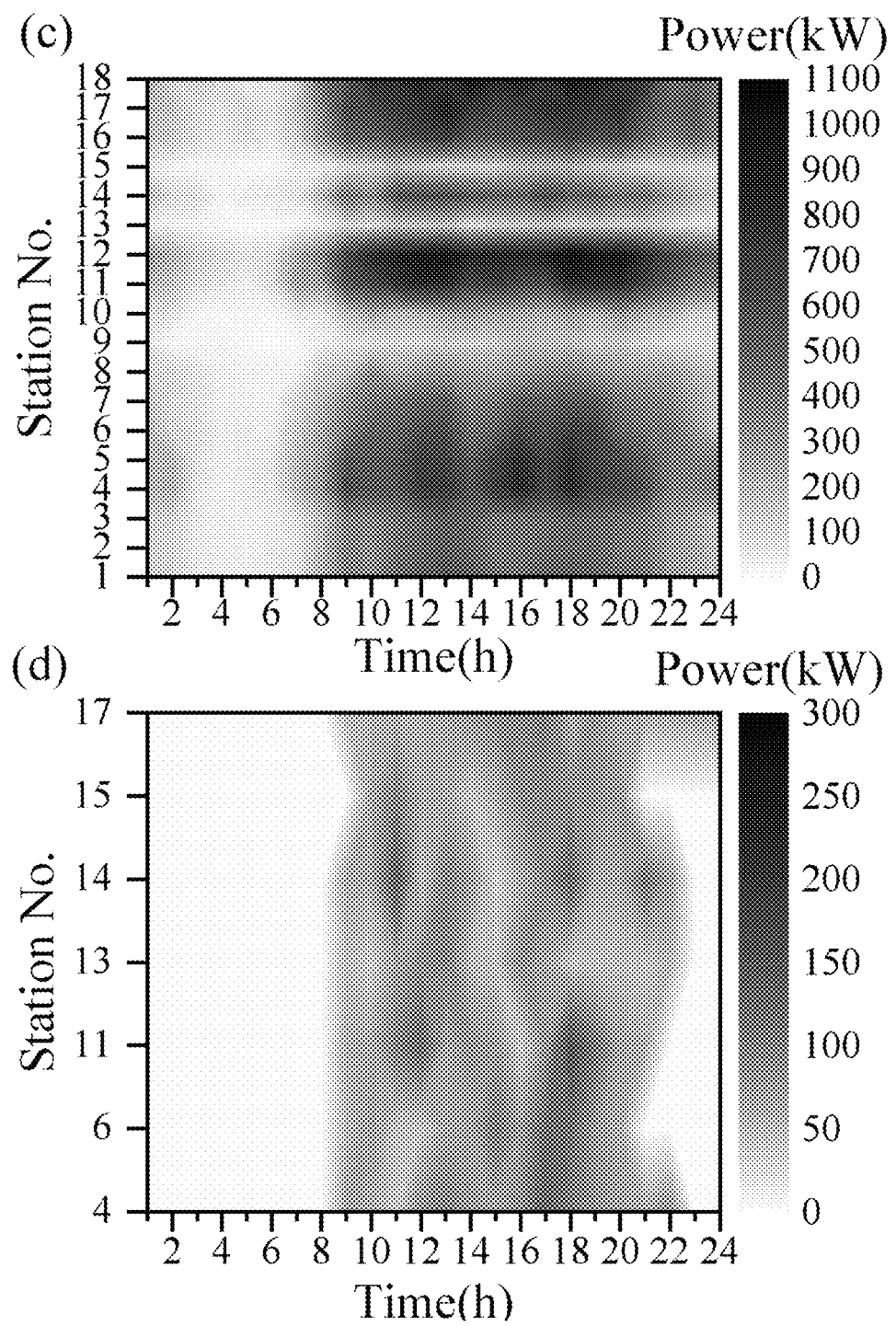
FIG. 5-CONTINUED

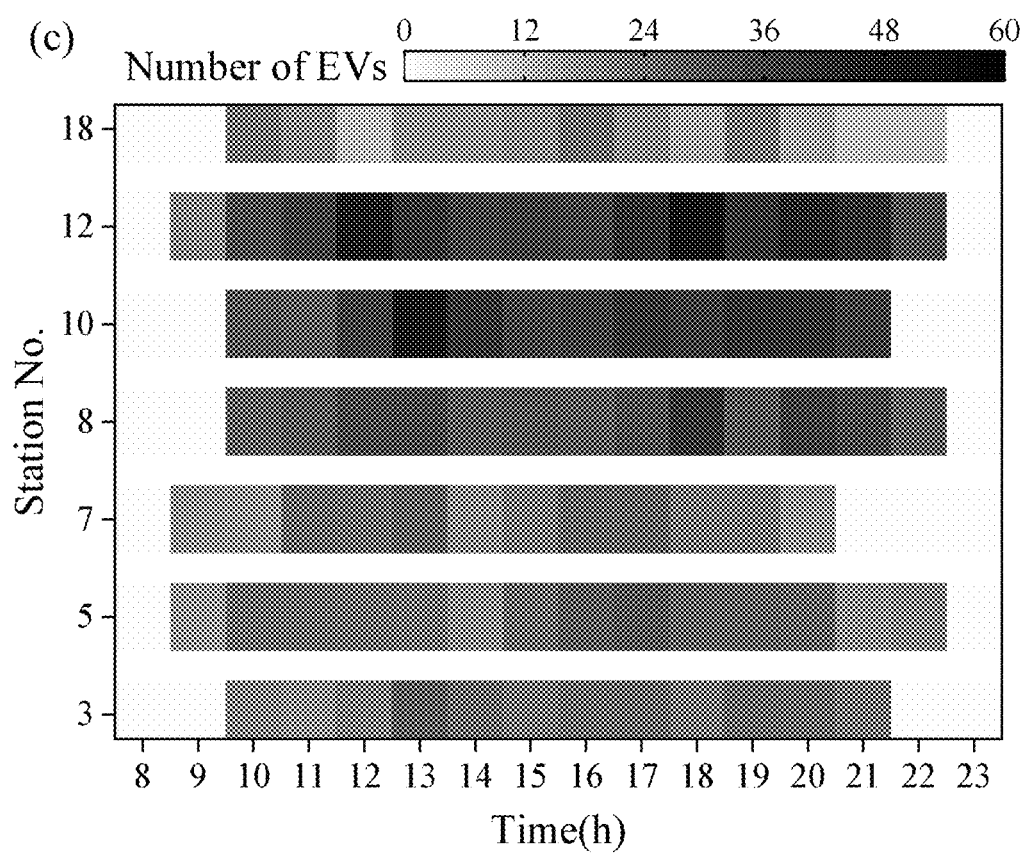
FIG. 6-CONTINUED

BILEVEL COORDINATED OPTIMIZATION METHOD FOR FIXED AND MOBILE CHARGING FACILITIES ON HIGHWAYS

CROSS-REFERENCE TO RELATED APPLICATIONS

This application claims priority to Chinese Patent Application No. 202211726231.1 with a filing date of Dec. 30, 2022. The content of the aforementioned application, including any intervening amendments thereto, is incorporated herein by reference.

TECHNICAL FIELD

The present disclosure relates to the technical field of charging facility optimization, and in particular, to a bilevel coordinated optimization method for fixed and mobile charging facilities on highways. The present disclosure enhances the flexibility of charging facilities, providing new choices for charging station operators and electric vehicle (EV) users.

BACKGROUND

In the wake of the rapid advancement of battery technologies, electric vehicles (EVs) have become a promising solution to the future of electrification and sustainable transportation. It is estimated that the global four-wheelers EVs will be up to 250 million by 2030. Meanwhile, EVs in China are expected to reach 100 million. μM. However, the development of EVs still faces challenges such as range anxiety and poor availability of charging facilities. There is a shortage of charging facilities for EV users during long-distance travel on highways, and the utilization of traditional fixed chargers (FCs) built by charging station operators is polarized. The presence of a large number of "zombie chargers" further reduces the utilization and economics of charging facilities and leads to poor user experience[2][3].

Research on the optimization of highway charging facilities typically assumes that EV parameters satisfy certain probability statistical characteristics. Monte Carlo simulation (MCS) is used to simulate individual EV loads and accumulate them to obtain the overall charging load. This approach facilitates the study of charging behaviors of individual users. Reference [4] proposes an optimization method for electric vehicle charging stations on the highway based on dynamic traffic simulation. References [5] and [6] establish a spatial and temporal distribution model of highway charging load through simulation of traffic choice behaviors of individual vehicles. References [6] and [7] determine, based on the M/M/c queuing theory, the capacity of the FC according to the maximum arrival rate of users during the charging peak period, resulting in low utilization of charging stations. Additionally, the above studies do not involve truck mobile chargers (TMCs).

The TMC, as a new charging approach, has greater spatial-temporal flexibility compared to the FC and is easier to expand. The TMC operates similarly to a power bank, with a higher capacity than a low-capacity portable charger (PC). The TMC is generally used to respond to an overloaded FC or set up a temporary charging location. In terms of TMC research, a few scholars have focused on the optimization and operation issues of the TMC and FC, especially in the context of highway charging. Reference [8] uses a user equilibrium model and a traffic refueling location model to characterize the impact of urban traffic congestion on EV path selection and solves the optimization problem of TMC location. Reference [9] optimizes the TMC capacity given the locations and capacities of FCs in residential and commercial areas of a given city, with the authors directly specifying the charging demands of the FC and TMC. Reference [10] models charging demands as a uniform distribution and uses fixed-point theorems to solve the coordinated optimization problem of the TMC and FC. However, highway charging loads have typical tidal characteristics, and traditional FC optimization studies may result in low utilization. Existing TMC studies often optimize TMCs separately based on the given FC optimization result[11].

CITED REFERENCES

[1] IEA. Global EV outlook 2022[EB/OL]. [2022-06-29]. https://www.iea.org/reports/global-ev-outlook-2022.
[2] 2022 Annual report on electric vehicle charging infrastructure in major Chinese cities [EB/OL]. [Jun. 20, 2022] https://www.caupd.com, Accessed on Jun. 20, 2022.
[3] Yi T, Zhang C, Lin T, et al. Research on the spatial-temporal distribution of electric vehicle charging load demand: A case study in China[J]. Journal of Cleaner Production, 2020, 242:118457.
[4] GE SHAOYUN, ZHU LINWEI, LIU HONG, et al. Optimal deployment of electric vehicle charging stations on the highway based on dynamic traffic simulation[J]. Transactions of China Electro-technical Society, 2018, 33(13):11.
[5] Xie R, Wei W, Khodayar ME et al. Planning fully renewable powered charging stations on highways: a data driven robust optimization approach. IEEE Transactions on Transportation Electrification, 2018: 817-830.
[6] MU YUNFEI, DONG XIAOHONG, JIA HONGJIE, YU XIAODAN, et al. Planning method of electric vehicle fast charging stations on the expressway, US Pat. No. U.S. Ser. No. 10/360,519B2.
[7] Yao W, Zhao J, Wen F, et al. A Multi-Objective Collaborative Planning Strategy for Integrated Power Distribution and Electric Vehicle Charging Systems[J]. IEEE Transactions on Power Systems, 2014, 29(4):1811-1821.
[8] Wang F, Chen R, Miao L, et al. Location Optimization of Electric Vehicle Mobile Charging Stations Considering Multi-Period Stochastic User Equilibrium[J]. Sustainability, 2019, 11,5841
[9] Hayajneh HS, Zhang X. Logistics Design for Mobile Battery Energy Storage Systems[J]. Energies, 2020, 13(5):1157.
[10] CW A, LB Xi, HA Fang, et al. Hybrid of fixed and mobile charging systems for electric vehicles: System design and analysis[J]. Transportation Research Part C: Emerging Technologies, 2021, 126:103068.
[11] TA Peng, HB Fang, LA Xi, et al. Online-to-offline mobile charging system for electric vehicles: Strategic planning and online operation[J]. Transportation Research Part D: Transport and Environment, 2020, 87:102522.

SUMMARY OF PRESENT INVENTION

The present disclosure provides a bilevel coordinated optimization method for fixed and mobile charging facilities on highways. The present disclosure enhances the utilization and flexibility of charging facilities on highways, and can effectively obtain a spatial-temporal distribution of TMC and FC charging demands to complete coordinated optimization for charging facilities, providing new choices for charging station operators and EV users. Details are described as follows:

A bilevel coordinated optimization method for fixed and mobile charging facilities on highways is provided, including:

constructing an optimization model framework which includes an upper-layer coordinated location optimization model and a lower-layer coordinated capacity optimization model;

where the upper-layer coordinated location optimization model is used to optimize locations of charging stations and determine locations and time points of charging demands that require TMC deployment;

the lower-layer coordinated capacity optimization model is used to optimize TMC and FC capacities at candidate sites, improving an utilization rate of FCs; and performing equivalent linearization on a nonlinear problem using a big-M method and converting the problem into a mixed-integer linear programming model, and implementing a data exchange process between upper and lower layers using an analytical target cascading (ATC) technique.

The upper-layer coordinated location optimization model includes an EV model, an improved income approach (IIA) model, a TMC location optimization model, an FC location optimization model, and a TMC depot optimization model.

In one embodiment, the lower-layer model includes a TMC capacity optimization model and an FC capacity optimization model.

The EV model is as follows:

Simulations end when the following convergence condition is met or a maximum simulation count is reached, resulting in a spatial-temporal distribution of charging demands:

$$\max\left\{\left\|\left(\sum_{j=1}^{M} P_{t,j}^L - \sum_{j=M}^{2M} P_{t,j}^L\right)/M\right\|\right\} \leq \varepsilon_1$$

where $P_{t,j}^L$ represents charging demands in each section of a highway network; M and $\varepsilon_l$ are constants.

Further, the IIA model is as follows: probabilities for TMC charging and FC charging are shown as follows:

$P_r\{\text{select } TMC \text{ model at site } z\} = \exp(c_{zi}^{fc})/\{\exp(c_{zi}^{tmc}) + \exp(c_{zi}^{fc})\}$ $P_r\{\text{select } FC \text{ model at site } z\} = \exp(c_{zi}^{tmc})/\{\exp(c_{zi}^{tmc}) + \exp(c_{zi}^{fc})\}$ where $c_{zi}^{tmc}$ and $c_{zi}^{fc}$ are costs when user i chooses TMC or FC charging at site z.

The TMC location optimization model is as follows:

$$t_{st,z}^{tmc} = \sum_{i=1}^{X_{t,z}^{tmc}} m_{ci}^{tmc} / \sum_{t=1}^{24}\sum_{i=1}^{X_{t,z}^{tmc}} m_{ci}^{tmc} \geq \varphi, \exists t \in [1, t_{st,z}^{tmc}]$$

$$t_{e,z}^{tmc} = \sum_{i=1}^{X_{t,z}^{tmc}} m_{ci}^{tmc} / \sum_{t=1}^{24}\sum_{i=1}^{X_{t,z}^{tmc}} m_{ci}^{tmc} \geq \varphi, \exists t \in [t_{e,z}^{tmc}, 24]$$

where $X_{t,z}^{tmc}$ represents a total number of EVs that choose TMC charging at candidate site z at time point t; $t_{st,z}^{tmc}$ and $t_{e,z}^{tmc}$ respectively represent a service start time and a service end time of a TMC; and $\varphi$ represents a power-weighted coefficient.

A utilization rate constraint is as follows:

$$x_z = \begin{cases} 1, & \text{if } \sum_{t=t_{st,z}^{tmc}}^{t_{e,z}^{tmc}} (\rho_{zt}^{tmc} \geq \delta) \geq \upsilon, \forall z \in S_c^{tmc} \\ 0, & \text{otherwise} \end{cases}$$

where $\rho_{zt}^{tmc}$ represents a utilization rate of charging station z per unit time, which is determined by the coordinated capacity model; $\delta$ represents a lower bound for the utilization rate considering the economic viability of the TMC, and $\upsilon$ represents hours when the utilization rate is less than the lower bound.

The TMC depot optimization model is as follows: a location of a TMC depot is optimized based on the minimization of construction and operation costs:

$$\min C^D = \sum_{y \in S_c^D} x_y \left\{ c_{dp,y} \frac{r_0(1+r_0)^q}{(1+r_0)^q - 1} \right\} +$$

$$\sum_{y \in S_c^D} x_y(c_{sl,y}^D + c_{mt,y}^D) + D_0 \sum_{y \in S_c^D, z \in S_{c,f}^{tmc}} x_y x_{yz} c_{el,y}^{tmc}(d_{yz} C_e^{tmc} + \eta_p^d \gamma E_z^{tmc})$$

s.t. $\sum_{y \in S_c^D} x_y x_{yz} = 1, \forall z \in S_{c,f}^{tmc}$ $\sum_{z \in S_{c,f}^{tmc}} x_y x_{yz} \eta_p^d \gamma E_z^{tmc} \leq E_{ymax}^D, \forall y \in S_c^D$ The vector $x^D$ includes Boolean variables, with $x_y=1$ when a TMC depot is set at depot y, where $y \in S_c^D$; otherwise, $x_y=0$. $r_0$ represents a discount rate, and q represents an optimization period. The vector $x_{yz}^D$ includes Boolean variables, indicating whether a TMC at site z is assigned to depot y. $E_{ymax}^D$ represents a capacity constraint determined by local renewable energy and power grid conditions.

The technical solutions provided by the present disclosure have the following beneficial effects:

(1) The optimization method proposed by the present disclosure enhances the utilization and flexibility of fixed charging facilities.

(2) The present disclosure serves as an effective complement to fixed charging facilities, being more "friendly" to charging station operators and electric vehicle users.

(3) The present disclosure offers a new solution for the rapid expansion of charging facilities and has the potential to further increase the profitability of operators.

DETAILED DESCRIPTION OF THE EMBODIMENTS

In order to make the objective, technical solution and advantages of the present disclosure clearer, implementation modes of the present disclosure will be further described in detail.

Figure 1:
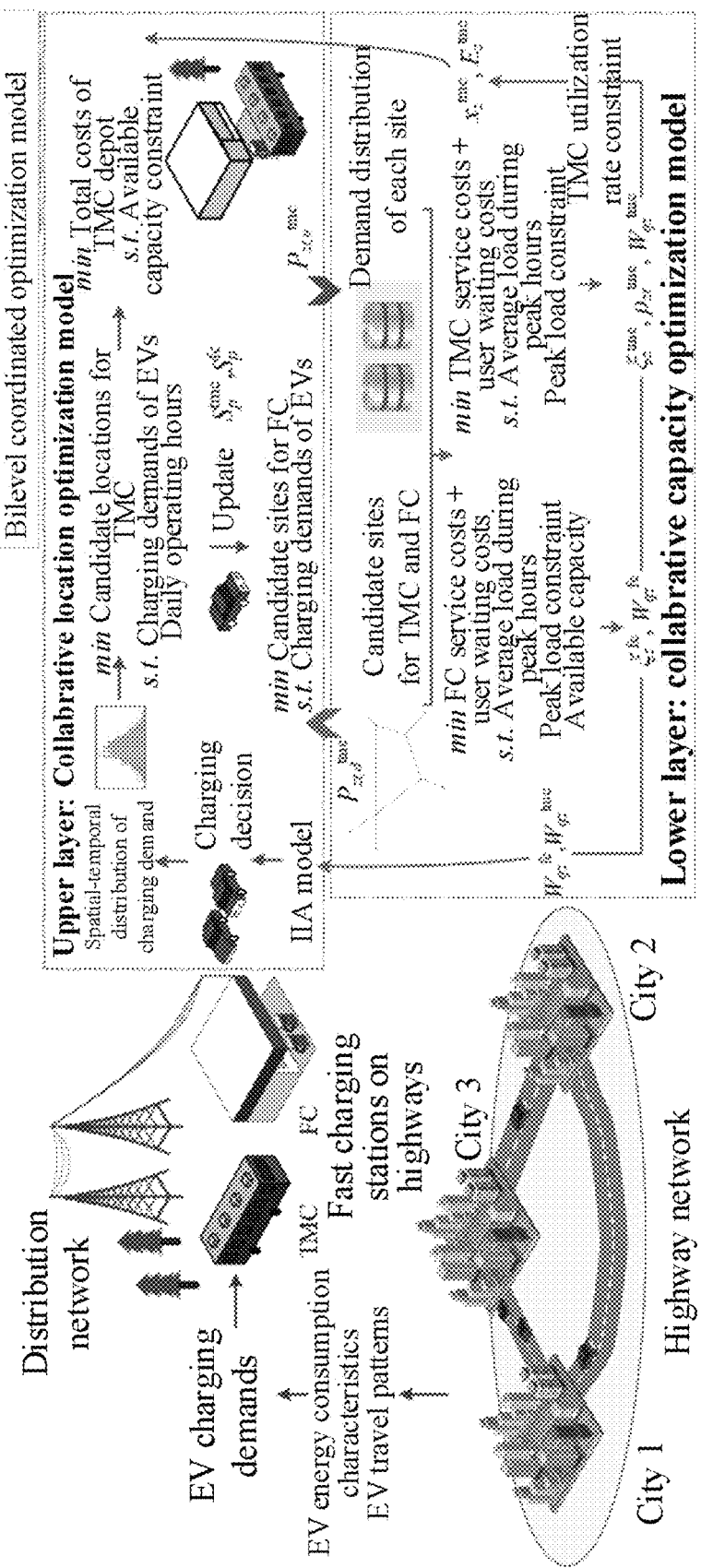
FIG. 1 is an architectural diagram of a bilevel coordinated optimization method for fixed and mobile charging facilities on highways.

The optimization model framework designed in the embodiments of the present disclosure includes an upper-layer collaborative location optimization (CLO) model and a lower-layer collaborative capacity optimization (CCO) model. The upper-layer model consists of an EV model, an IIA model, a TMC location optimization model, an FC location optimization model, and a TMC depot location optimization model, while the lower-layer model consists of a TMC capacity optimization model and an FC capacity optimization model, as shown in FIG. 1.

Energy distribution patterns of different types of EVs are obtained based on energy consumption characteristics thereof, and EV travel patterns are obtained based on historical traffic data, thus obtaining an origin-destination (OD) distribution of a road network and a probability distribution of EV departure moments. Then, OD analysis and a Floyd algorithm are employed to determine travel information.

Charging information of EVs is obtained based on the travel information in combination with MCS, thus obtaining a spatial-temporal distribution of charging demands.

Value of time for a user is used to estimate waiting costs of the user. A value-driven strategy is introduced to simulate probabilities of users choosing TMC and FC. Furthermore, positions and durations of high-intensity charging demands are determined to determine deployment positions and service hours of TMCs.

The spatial-temporal distribution of charging demands $(S_P^{tmc}, S_P^{fc})$ is updated, and locations of FCs and TMC depots are optimized. The FC location is optimized based on the minimization of the number of charging stations, while the location of the TMC depot is optimized based on the minimization of construction and operation costs.

The number of TMCs(FCs) at each candidate site ($\xi_z^{tmc}$, $\xi_z^{fc}$) and a TMC battery capacity ($E_z^{tmc}$) are optimized with an average load during peak hours.

Meanwhile, a peak charging load serves as a constraint for service quality:

$$W_{qzm} = L_{qzm}/\lambda_{qzm} \leq W_{qmax} \quad (1)$$

where $\lambda_{zm}$, $L_{qzm}$, and $W_{qzm}$ represents an arrival rate, a queue length, and a queue time during peak hours; $W_{qmax}$ represents a maximum queue time acceptable to EV users.

A TMC utilization rate at each station ($p_{zt}^{tmc}$) needs to satisfy a certain utilization constraint, so as to update the TMC location ($x_z^{tmc}$). The average queue time ($W_{qz}^{tmc}$, $W_{qz}^{fc}$) at each station is substituted into the IIA model to generate a distribution of TMC and FC charging demands.

$$x_z = \begin{cases} 1, & \text{if } \sum_{t=t_{st,z}^{tmc}}^{t_{e,z}^{tmc}} (\rho_{zt}^{tmc} \geq \delta) \geq \upsilon, \forall z \in S_c^{tmc} \\ 0, & \text{otherwise} \end{cases} \quad (2)$$

where $p_{zt}^{tmc}$ is a TMC utilization rate per unit time determined by the CCO model; $t_{st,z}^{tmc}$ and $t_{e,z}^{tmc}$ are a start time and an end time of a TMC$_z$ charging service; $\delta$ is a lower bound for the TMC utilization rate, and o represents hours when the utilization rate is less than the lower bound; and $S_c^{tmc}$ is a set of candidate TMC sites.

Based on an ATC technique, a TMC charging load ($P_{zt}^{tmc}$) of each candidate site is exchanged between the upper and lower layers of the bilevel optimization model until convergence is achieved:

$$\max(P_{zt,u}^{tmc(k)} - P_{zt,d}^{tmc(k)}) \leq \varepsilon_2, \forall z \in S_{c,f}^{tmc} \forall t \in t_{st,z}^{tmc} t_{e,z}^{tmc}) \quad (3)$$

where $P_{zt,u}^{tmc(k)}$ and $P_{zt,d}^{tmc(k)}$ are loads at each TMC candidate site at a time point t after the k-th iteration; $\varepsilon_2$ is a convergence coefficient; and $S_{c,f}^{tmc}$ is a set of TMC locations.

The embodiments of the present disclosure propose a bilevel coordinated optimization method for fixed and mobile charging facilities on highways to enhance the flexibility of charging. The upper-layer collaborative location optimization (CLO) model is developed to optimize locations of charging stations and determine locations and time points of high-intensity charging demands that require TMC deployment.

Furthermore, the lower-layer CCO model is formulated to optimize the TMC and FC capacities at candidate sites, improving the utilization rate of FCs. In the CLO model, the OD analysis, Floyd algorithm, and Monte Carlo simulation (MCS) are employed to generate a spatial-temporal distribution of charging demands based on historical data. The embodiments of the present disclosure develop an IIA model to effectively capture the heterogeneity in charging behaviors among EV users. The waiting costs for EV users are estimated based on their Value of Time (VOT). This helps make a better choice between TMC charging and FC charging. To solve the bilevel optimization model, the big-M method is employed to perform equivalent linearization on a nonlinear problem and convert the problem into a mixed-integer linear programming (MTLP) model. Additionally, the ATC technique is employed to facilitate data exchange between the upper and lower layers.

I. Coordinated Location Optimization Model (1) EV Model

A battery capacity distribution for four types of EVs is obtained based on their energy consumption characteristics. The distribution of departure moments $t_s$ for EVs is derived from local traffic statistics data, with other relevant parameters following a truncated normal distribution as specified in Table 1. This allows for determining a pre-charging travel distance $ran_{ac}$ and a maximum remaining range $ran_{sc}$ for electric vehicles.

TABLE 1

Distribution of Travel Parameters for EVs

| Variable | $soc_{si}$ | $soc_{ci}$ | $d_{ri}$ |
|---|---|---|---|
| Distribution pattern | Normal | Normal | Normal |
| Distribution parameters | $\mu^d = 0.85$ $\sigma^d = 0.1$ | $\mu^d = 0.2$ $\sigma^d = 0.5$ | $\mu^d = 25$ $\sigma^d = 12.6$ |
| Minimum | 0.6 | 0.1 | 5 |
| Maximum | 0.95 | 0.3 | 60 |

$soc_{si}$ represents state of charge (SOC) of EV, upon entering a highway network; $soc_{ci}$ represents SOC when the user deems charging necessary; and $d_{ri}$ represents a remaining distance after leaving the highway network.

Additionally, the OD analysis provides a start point and end point of the EV on the highway network, and the Floyd algorithm is used to determine a travel path of the EV. If an electric vehicle i requires charging during the journey, based on the SOC data and the remaining distance, a charging information matrix L is generated using MCS, including virtual charging points ($loc_i$) and post-charging SOC ($soc_i$). Considering practical factors such as a user travel time and a battery life, the target charging quantity for EVs is set to meet travel demands, typically with $soc_i$ not exceeding 0.8. Consequently, an arrival time point ($\tau_i$), a charging capacity ($m_{ci}$), and a charging time ($s_i$) are generated. Based on the law of large numbers, simulations end when the convergence condition in equation (4) is met or a maximum simulation count (J) is reached, resulting in a spatial-temporal distribution of charging demands.

$$\max\left[\left|\left(\sum_{j=1}^{M} P_{t,j}^L - \sum_{j=M}^{2M} P_{t,j}^L\right)/M\right|\right] \leq \varepsilon_1 \quad (4)$$

where $P_{tj}^L$ represents charging demands in each section of the highway network; M and $\varepsilon_l$ are constants.

(2) IIA Model

For each charging request from EVs, the coordinated charging facilities offer two options: TMC or FC charging, both of which provide charging services at candidate charging stations. The charging costs for user i under different charging modes at site z are expressed in equation (5) and equation (6):

$$c_{zi}^{tmc} = \alpha_z^{tmc} m_{ci} + \beta \cdot VOT_i \cdot (W_{qz}^{tmc} + S_i) \quad (5)$$

$$c_{zi}^{fc} = \alpha_z^{fc} m_{ci} + \beta \cdot VOT_i \cdot (W_{qz}^{fc} + s_i) \quad (6)$$

In the above equations, the first term represents the charging costs, and the second term represents the time costs. For the electricity price, $\alpha_z^{tmc} > \alpha_z^{fc}$, and for the average queue time during peak hours, $W_{qz}^{tmc} < W_{qz}^{fc}$. This reflects the differences in costs and service levels between TMC and FC. R signifies a value-of-time growth factor of the time value considering user psychology, primarily related to the accumulated charging waiting time. The value of time for waiting (VOT) is strongly correlated with the income of user i. Considering the heterogeneity in EV user charging behaviors, an income range distribution of residents in the local area is fitted based on travel survey data.

$$VOT_i = INC_i/T_m \quad (7)$$

$INC_i$ is a monthly income of user i obtained based on an income distribution function, and $T_i$ is an average monthly working time. Therefore, user i will measure the utility generated during the charging process, including "benefits" (savings in waiting time costs) or "losses" (increase in charging costs). According to the theory of random utility maximization, the probability of choosing TMC or FC charging is expressed in equation (8) and equation (9):

$$P_{r\{select\ TMC\ mode\ at\ site\ z\}} = \exp(c_{zi}^{fc})/\{\exp(c_{zi}^{tmc}) + \exp(c_{zi}^{fc})\} \quad (8)$$

$$P_{r\{select\ FC\ mode\ at\ site\ z\}} = \exp(c_{zi}^{tmc})/\{\exp(c_{zi}^{tmc}) + \exp(c_{zi}^{fc})\} \quad (9)$$

(3) TMC Model

Figure 2:
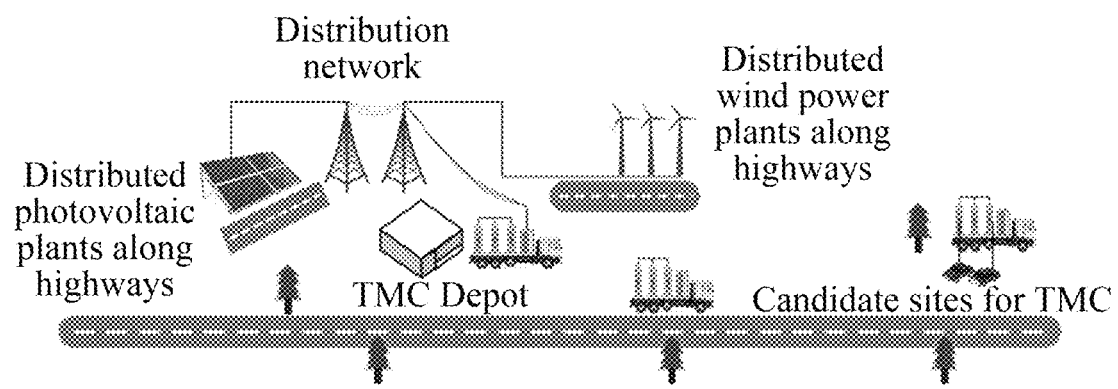
FIG. 2 is a schematic diagram showing TMC operational status.

The TMC consists of a specific number of charging piles and lithium-ion battery packs integrated in a container carried by a truck. The TMC is moved to a designated depot, and is charged from local renewable energy sources and the power grid during periods of low energy demand. Additionally, each TMC arrives at a specified location at a scheduled time point to provide a charging service. TMC depots can be constructed in areas rich in renewable energy in the vicinity of their service locations, for example, near distributed photovoltaic plants or wind power plants along highways (as shown in FIG. 2). Therefore, the TMC model determines locations and time periods of the charging service, to respond to high-intensity charging demands and minimize the number of TMCs to save investment costs.

A charging point coverage matrix $\tau^{tmc}$ is constructed. For each $loc_i^{tmc}$ (a virtual charging point set $S_p^{tmc}$ with $p^{tmc}$ elements), if user i can arrive at a candidate station $CS_z^{tmc}$ (a candidate site set $S_c^{tmc}$ with $c^{tmc}$ elements, predetermined based on geographic conditions) while satisfying travel constraints and the maximum remaining range $ran_{sc}$, then z is considered to cover i:

$$\Gamma_{zj} = \begin{cases} 1, & \text{if } z \text{ covers } i \\ 0, & \text{otherwise} \end{cases} \quad (10)$$

A vector $x^{tmc}$ consisting of Boolean variables is constructed, with the element $x_2=1$ if TMC is deployed at location z, where $z \in S_c^{tmc}$; otherwise, $x_2=0$. Therefore, the TMC location optimization problem can be expressed as:

$$\min \sum_{z \in S_c^{tmc}} x_z \quad (11a)$$

$$\text{s.t.} \sum_{z \in S_c^{tmc}: \Gamma_{zi}^{tmc}=1} x_z \geq 1, \forall i \in S_p^{tmc} \quad (11b)$$

$$t_{st,z}^{tmc} = \sum_{i=1}^{x_{t,z}^{tmc}} m_{ci}^{tmc} \bigg/ \sum_{t=1}^{24} \sum_{i=1}^{x_{t,z}^{tmc}} m_{ci}^{tmc} \geq \varphi, \exists t \in \left[1, t_{st,z}^{tmc}\right] \quad (11c)$$

$$t_{e,z}^{tmc} = \sum_{j=1}^{x_{t,z}^{tmc}} m_{ci}^{tmc} \bigg/ \sum_{t=1}^{24} \sum_{i=1}^{x_{t,z}^{tmc}} m_{ci}^{tmc} \geq \varphi, \exists t \in \left[t_{e,z}^{tmc}, 24\right] \quad (11d)$$

where $t_{t,z}^{tmc}$ represents a total number of EVs charging at candidate site z at time point t; $t_{st,z}^{tmc}$ and $t_{e,z}^{tmc}$ respectively represent a service start time and a service end time of a TMC; and $\varphi$ represents a power-weighted coefficient.

Constraint (11b) ensures that all charging demands can be met, while constraints (11c) to (11d) determine the duration of high-intensity charging demands.

Simultaneously, to ensure the economic viability of TMC, certain utilization rate constraints need to be satisfied.

$$x_z = \begin{cases} 1, & \text{if } \sum_{t=t_{st,z}^{tmc}}^{t_{e,z}^{tmc}} (\rho_{zt}^{tmc} \geq \delta) \geq \upsilon, \forall z \in S_c^{tmc} \\ 0, & \text{otherwise} \end{cases} \quad (12)$$

where $p_{zt}^T$ represents a utilization rate of charging station z per unit time (1 h), which is determined by the CCO model. δ represents a lower bound for the utilization rate considering the economic viability of the TMC, and o represents hours when the utilization rate is less than the lower bound.

(4) FC Model and TMC Depot Model

In the upper-layer CLO model, the charging demands on the highway network are obtained through the EV model. The service locations and durations of TMCs are determined by the IIA model and TMC model. Meanwhile, the remaining charging demands are served by FCs. Similar to the TMC model, in the embodiments of the present disclosure, a charging point coverage matrix $\tau^{fc}$ is set up, and FC installation locations are optimized by minimizing the number of candidate sites.

$$\min \sum_{z \in S_c^{fc}} x_z \quad (13a)$$

$$\text{s.t.} \sum_{z \in S_c^{fc} : \tau_{zi}^{fc}=1} x_z \geq 1, \forall i \in S_p^{fc} \quad (13b)$$

$$l_{min}^{fc} \leq l_z^{fc} \leq l_{max}^{fc} \quad (13c)$$

The vector $x^{fc}$ consists of Boolean variables, with $x_2=1$ when FC is deployed at location z, where $z \in S_c^{fc}$; otherwise, $x_2=0$. $f_{min}^{fc}$, $f_{max}^{fc}$ are station distance constraints considering economic viability and EV mileage limitations.

After all candidate charging station locations are determined, a spatial-temporal distribution of TMC and FC charging demands at each site is obtained. In addition, the location of the TMC depot is optimized based on the minimization of construction and operation costs:

$$\min C^D = \sum_{y \in S_c^D} x_y \left\{ c_{dp,y} \frac{r_0(1+r_0)^q}{(1+r_0)^q - 1} \right\} + \quad (14a)$$

$$\sum_{y \in S_c^D} x_y (c_{sl,y}^D + c_{mt,y}^D) + D_0 \sum_{y \in S_c^D, z \in S_{c,f}^{tmc}} x_y x_{yz} c_{el,y}^{tmc} (d_{yz} C_e^{tmc} + \eta_p^d \gamma E_z^{tmc})$$

$$\text{s.t.} \sum_{y \in S_c^D} x_y x_{yz} = 1, \forall z \in S_{c,f}^{tmc} \quad (14b)$$

$$\sum_{z \in S_{c,f}^{tmc}} x_y x_{yz} \eta_p^d \gamma E_z^{tmc} \leq E_{ymax}^D, \forall y \in S_c^D \quad (14c)$$

The vector $x^D$ consists of Boolean variables, with $x_y=1$ when a TMC depot is set at depot y, where $y \in S_c^D$; otherwise, $x_y=0$. $r_0$ represents a discount rate, and q represents an optimization period. The vector $x_{yz}^D$ consists of Boolean variables, indicating whether the TMC at site z is assigned to depot y. $E_{ymax}^D$ represents a capacity constraint determined by local renewable energy and power grid conditions.

In equation (14a), the first, second, and third terms represent investment costs, fixed operational and maintenance costs, and variable costs of the TMC depot, respectively. Equation (14b) ensures that each TMC can only be assigned to one depot. Equation (14c) ensures that the available capacity of the depot meets local renewable energy and power grid capacity requirements. By introducing a vector x consisting of Boolean variables, the above nonlinear constraints are linearized using the big-M method:

$$x = x_y x_{yz} \quad (15a)$$

$$x \leq x_y \quad (15b)$$

$$X \leq x_{yz} \quad (15c)$$

$$x \geq x_y + x_{yz} - 1 \quad (15d)$$

Equations (15b) to (15d) are auxiliary constraints.

II. Collaborative Capacity Optimization Model

In contrast to the methods in references 0 and 0 that determine the FC capacity based on peak load, since the TMC takes partial load during peak hours, this embodiment of the present disclosure determines the TMC and FC capacities based on the average load during peak hours, with the load in the peak charging period as a constraint. Based on the results obtained from the CLO model, a solving process of the CCO model is illustrated using the example of a charging station at site z.

According to M/M/c/∞/∞ queue theory, EV users arrive at charging station z in a Poisson flow with parameter λ, and the charging time follows a negative exponential distribution with parameter μ. It is assumed that user i arrives at z at a time point $\tau_i$, the total number of charging users during peak hours is $N_z$, the queue time $\omega_i$ of the user is given by equation (16), and the average arrival rate $\lambda_z$ and average service rate $\mu_z$ are given by equations (17) and (18):

$$\omega_{i+1} = \begin{cases} \omega_i + s_i - t_i, & \text{if } \omega_i + s_i - t_i > 0 \\ 0, & \text{otherwise} \end{cases} \quad (16)$$

$$\lambda_z = (N_z + 1) / \sum_{i=1}^{N_z} t_i \quad (17)$$

$$\mu_z = (N_z + 1) / \sum_{i=1}^{N_z} s_i \quad (18)$$

where $t_i$ otherwise an interval time between successive user arrivals. Assuming all charging piles have the same rated power, the number of charging piles and battery capacity of each TMC are optimized:

$$\min \{C_s \cdot \xi_z + VOT \cdot L_{sz}\} \quad (19a)$$

$$\text{s.t. } L_{sz} = L_{qz} + \lambda_z / \mu_z \quad (19b)$$

$$L_{qz} = \sum_{n=\xi_z+1}^{\infty} (n - \xi_z) P_{nz} = \frac{(\xi_z \rho_z)^{\xi_z} \rho_z}{\xi_z! (1-\rho_z)^2} P_{0z} \quad (19c)$$

$$P_{0z} = \left[ \sum_{k=0}^{\xi_z - 1} \frac{1}{k!} \left(\frac{\lambda_z}{\mu_z}\right)^k + \frac{1}{\xi_z!} \cdot \frac{1}{1-\rho_z} \cdot \left(\frac{\lambda_z}{\mu_z}\right)^{\xi_z} \right]^{-1} \quad (19d)$$

$$W_{qzm} = L_{qzm} / \lambda_{zm} \leq W_{qmax} \quad (19e)$$

$$C_s = \sum_{m=1}^{3} \kappa_m \exp(r \zeta_m) / \zeta_m \quad (19f)$$

$$E_z^{tmc} = \sum_{t=t_{st,z}^{tmc}}^{t_{e,z}^{tmc}} \sum_{i=1}^{x_{t,z}^{tmc}} m_{ct}^{tmc} / \gamma \quad (19g)$$

-continued $$\kappa_1^{tmc} = c_{pl}^{tmc} + c_{bt} \sum_{z=1}^{f^{tmc}} w_z^{tmc} E_z^{tmc} / \xi_z + c_{tk} + c_{dp,y} \quad (19h)$$

$$\kappa_2^{tmc} = c_{sl}^{tmc} + c_{mt}^{tmc} \quad (19i)$$

$$\kappa_3^{tmc} = D_0 c_{el,y}^{tmc} \sum_{z=1}^{f^{tmc}} \left( \eta_p^d \gamma E_z^{tmc} + d_{yz} C_e^{tmc} \right) / \xi_{sm}^{tmc}, \; y \in S_{c,f}^D \quad (19j)$$

where $C_s$ represents costs per unit time converted to a single charging pile; $L_{sz}$ represents an average number of EVs; $L_{qz}$ represents an average queue length at station z; and $p_z = \lambda_z (\xi_z \mu_z)$ represents an average utilization rate. $P_{0z}$ represents a state probability. $\lambda_{zm}$, $L_{qzm}$, and $W_{qzm}$ represent an arrival rate, a queue length, and a queue time during peak hours, and $W_{qmax}$ represents a maximum queue time for EVs. m represents a cost type; $K_1$, $K_2$, and $K_3$ represent investment costs, fixed costs, and variable costs, respectively; r represents a discount rate per unit time; and $\xi$ represents a total time range. $\gamma$ represents a discharge depth considering round-trip efficiency and battery aging; $f^{tmc}$ and $\xi_{sm}^{tmc}$ represent a total number of candidate stations and a total number of TMCs, respectively; $w_z^{tmc}$ represents a weight coefficient; $c_{pl}^{tmc}$ represents costs of a charging pile; $c_{bt}$ represents costs of lithium-ion battery packs; $c_{tk}$, $c_{dp,y}$, $c^t$ $c$ and $c_{mt}^{tmc}$ represent truck and container costs, depot costs, employee wages, and maintenance costs per single charging pile, respectively; $c_{el,y}^{tmc}$ represents electricity costs; $\eta_p^d$ represents an efficiency parameter corresponding to energy loss; $D_0$ represents the number of operating days per year; $d_{yz}$ represents a round-trip distance from TMC z to depot y; $C_e^{\prime\prime o}$ represents energy consumption per kilometer for the TMC; $S_{c,f}^D$ represents a set of TMC depot locations.

Equation (19a) represents a sum of service costs and user waiting costs. Equation (19e) ensures that the queue time during peak hours meets the service quality constraint; amortization costs are obtained based on equation (19f). Subsequently, the number of charging piles for each FC is determined by the following optimization model:

$$\min\{C_s \cdot \xi_z + VOT \cdot L_{sz}\} \quad (20a)$$

s.t. (19b) – (19f) \quad (20b)

$$\sum_{i=1}^{x_{t,z}^{fc}} m_{ci}^{fc} \leq P_{zmax}^{fc}, \; \forall t \in [1, 24] \quad (20c)$$

$$E_z^{fc} = \sum_{t=1}^{24} \sum_{i=1}^{x_{t,z}^{fc}} m_{ci}^{fc} \leq E_{zmax}^{fc} \quad (20d)$$

$$\kappa_1^{fc} = c_{pl}^{fc} + c_{is,z} + c_{es,z} \quad (20e)$$

$$\kappa_2^{fc} = c_{sl}^{fc} + c_{mt}^{fc} \quad (20f)$$

$$\kappa_3^{fc} = D_0 \eta_p^d \sum_{z=1}^{f^{fc}} c_{el,z}^{fc} E_z^{fc} / \xi_{sm}^{fc} \quad (20g)$$

where $P_{zmax}^{fc}$, $E_{zmax}^{fc}$ represents an upper limit for FC power or capacity determined by distribution network constraints; $C_{is,z}$ represents installation costs, and $C_{es,z}$ represents construction costs. Equations (20c) to (20d) ensure that the peak charging power and available capacity meet the distribution network constraints. If the distribution network constraints are not satisfied, the grid operator needs to expand and upgrade the distribution network accordingly. As TMCs alleviate the pressure on the grid during peak hours and are deployed independent of the grid, it is advantageous in increasing the flexibility of the power system and reducing expansion and retrofitting costs. By 2020, the price of lithium-ion batteries had dropped to $140 per kilowatt-hour, with a continued downward trend. Considering that the technical requirements for TMC mobility are stricter than for FCs, this results in $c_{pl}^{tmc}$ and $c_{ml}^{tmc}$ being higher than $c_{pl}^{fc}$ and $c_{ml}^{fc}$. As TMCs typically charge from local renewable energy sources and the distribution network during periods of low energy demand, $C_{el,y}^{tmc}$ is lower than $c_{el,z}^{fc}$.

III. Solution of Bilevel Model

The data exchange process between the upper and lower layers is implemented based on the ATC technique. In the k-th iteration, objective functions of both the upper and lower layers need to be updated, as shown in equations (21) and (22). Additionally, the convergence condition is expressed in equation (23).

$$\min\left\{ P + ku_1 \sum_{z=1}^{f^{tmc}} \sum_{t=t_{st,z}^{tmc}}^{t_{e,z}^{tmc}} \left( \sum_{i=1}^{x_{t,z}^{tmc}} m_{ci}^{tmc} - P_{zt,d}^{tmc(k-1)} \right)^2 \right\} k > 1 \quad (21)$$

$$\min\left\{ C + ku_2 \sum_{z=1}^{f^{tmc}} \sum_{t=t_{st,z}^{tmc}}^{t_{e,z}^{tmc}} \left( P_{zt,u}^{tmc(k)} - \sum_{i=1}^{x_{t,z}^{tmc}} m_{ci}^{tmc} \right)^2 \right\}, k \geq 1 \quad (22)$$

$$\max\left( P_{zt,u}^{tmc(k)} - P_{zt,d}^{tmc(k)} \right) \leq \varepsilon_2, \forall z \in S_{c,f}^{tmc} \forall t \in [t_{st,z}^{tmc}, t_{e,z}^{tmc}] \quad (23)$$

The first and second terms in equations (21) and (22) represent an initial function and a penalty function. $P_{zt,u}^{tmc(k)}$ and $P_{zt,d}^{tmc(k)}$ are TMC loads at each candidate station at time point t after the k-th iteration; $u_1$ and $u_2$ are coefficients greater than 0; $\varepsilon_2$ is a convergence coefficient; and $S_{c,f}^{tmc}$ is a set of TMC locations.

Figure 3:
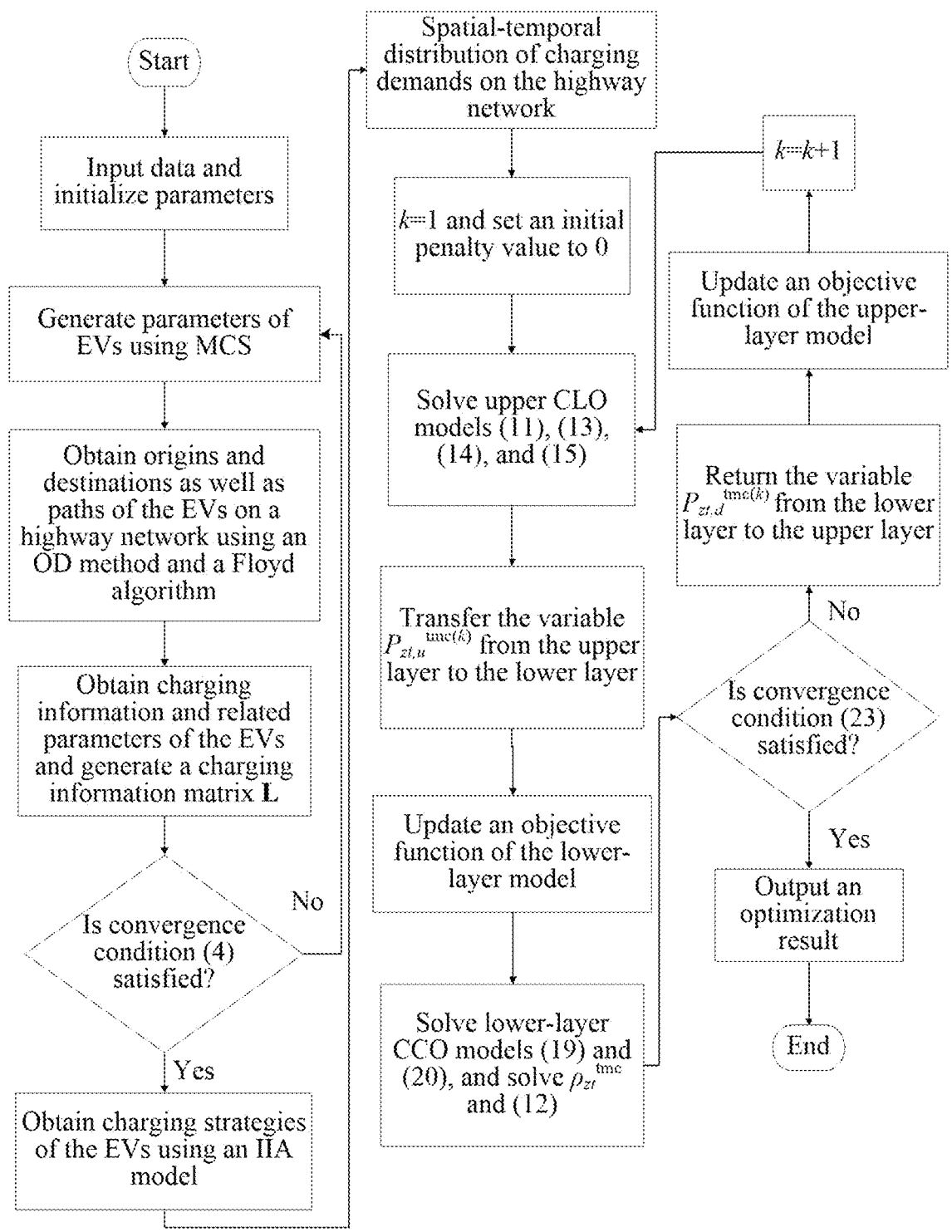
FIG. 3 is a flowchart of a bilevel coordinated optimization method for fixed and mobile charging facilities on highways.

Both the CLO and CCO models are coded using the YALMIP toolbox in the MATLAB environment and solved using Cplex 12.8.0. FIG. 3 is a flowchart of the optimization method, and simulations end when a convergence condition is met or a maximum iteration count (K) is reached.

IV. Embodiments

Figure 4:
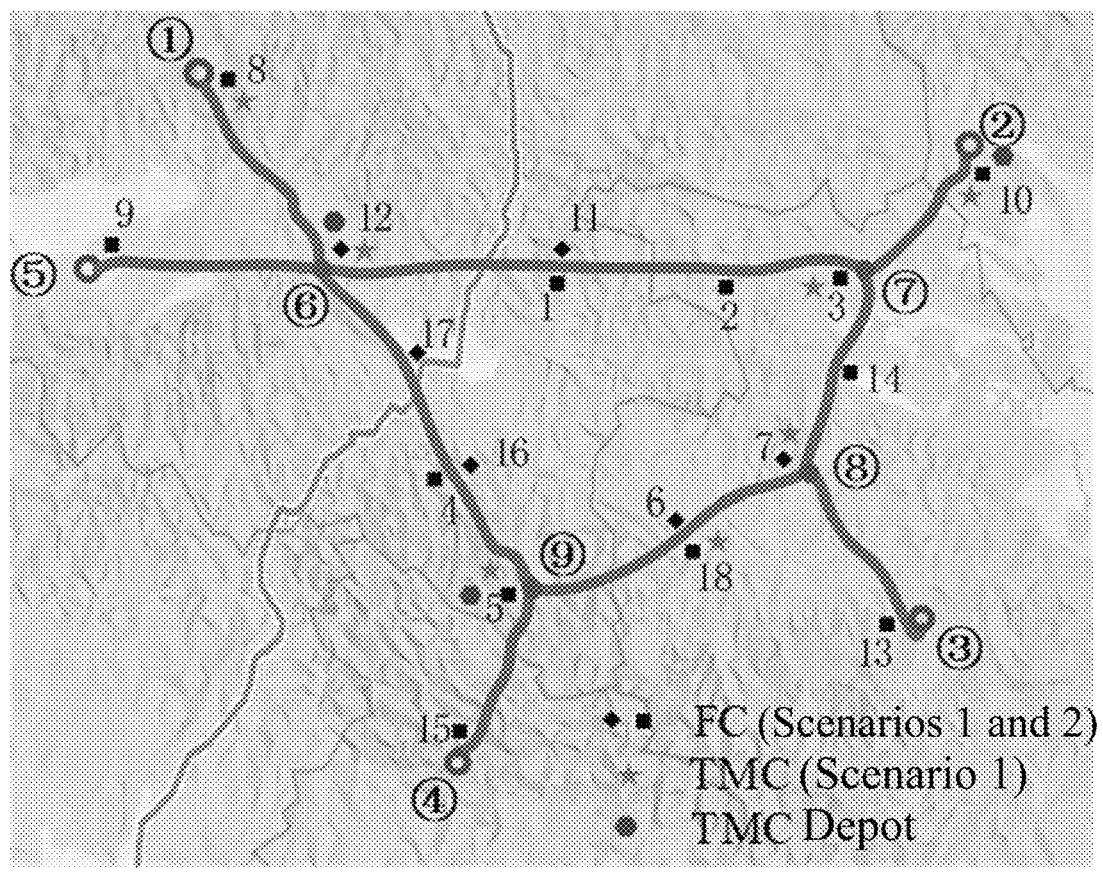
FIG. 4 is a schematic diagram of station configuration results for scenario 1 and scenario 2.
Figure 5:
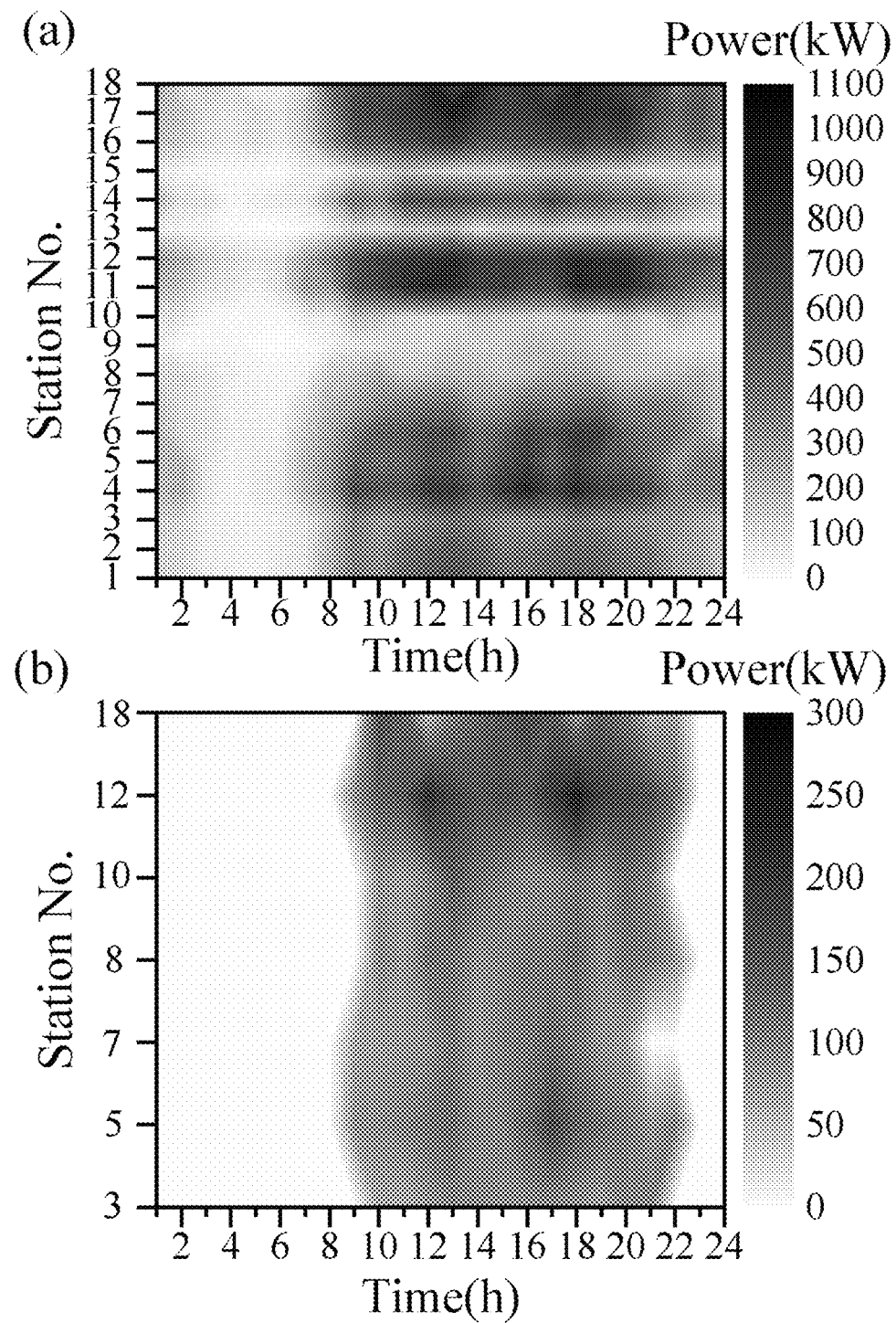
FIG. 5 is a schematic diagram of a spatial-temporal distribution of loads at each station, where (a) is a schematic diagram of FCs in scenario 1; (b) is a schematic diagram of TMCs in scenario 1; (c) is a schematic diagram of FCs in scenario 2; and (d) is a schematic diagram of excluded TMCs.
Figure 6:
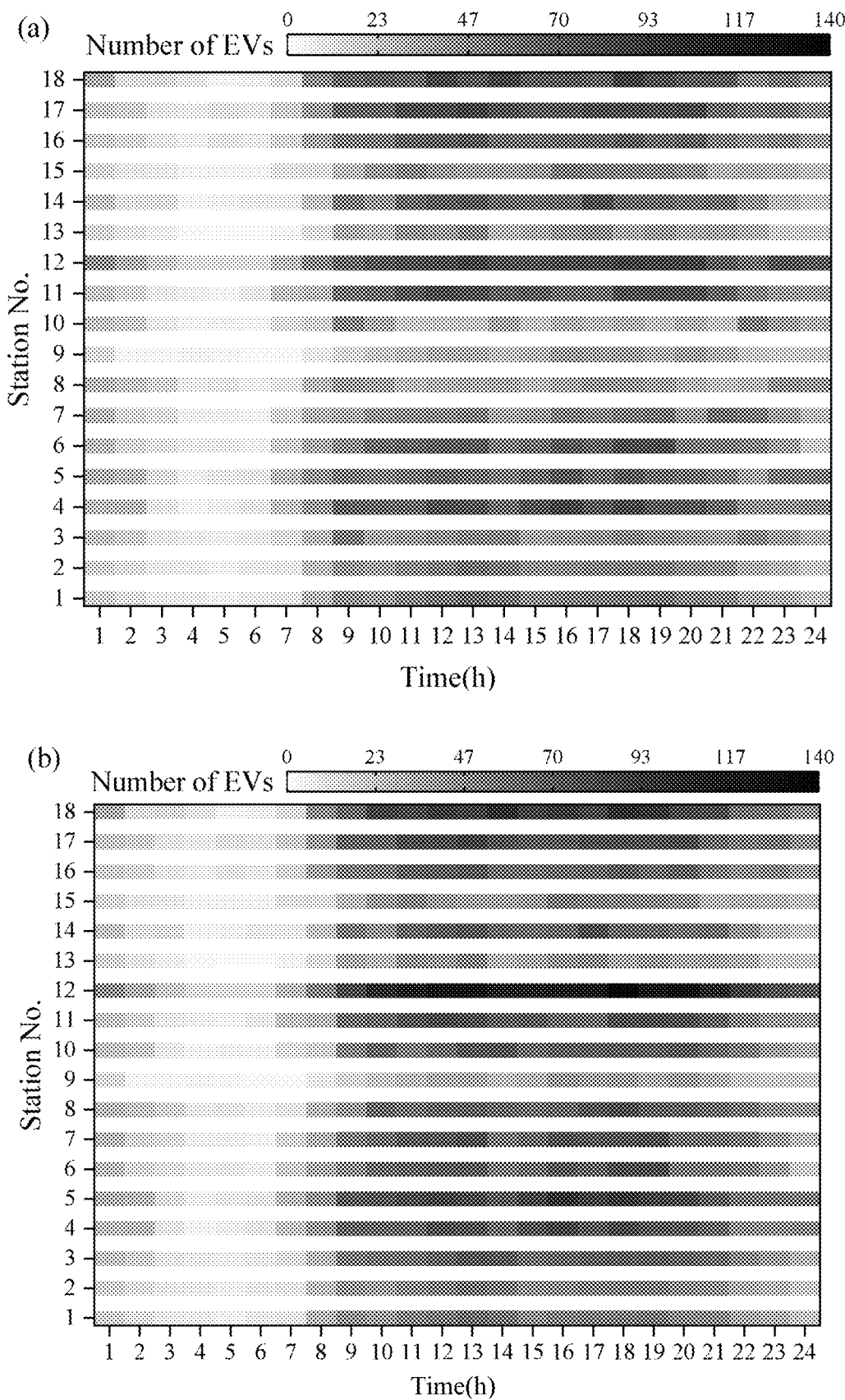
FIG. 6 is a schematic diagram of a spatial-temporal distribution of EVs at each station, where (a) is a schematic diagram of FCs in scenario 1; (b) is a schematic diagram of FCs in scenario 2; and (c) is a schematic diagram of TMCs in scenario 1.

For the embodiments of the present disclosure, a case study is conducted on the circular highway network from reference [4]. This highway network has five entrances or exits with a total mileage of 465 km. Entrances/exits 1, 2, and 4 represent entrances or exits to large cities, while entrances/exits 3 and 5 represent entrances or exits to small cities, making this topology typical in modern urban clusters. The distribution of EV departure moments $t_s$ and the OD matrix are shown in FIG. 4 and FIG. 5, respectively. Based on survey data on travel patterns of residents in the Beijing-Tianjin-Hebei region, the monthly income distribution of electric vehicle users obtained based on the IIA model is shown in FIG. 6.

With the optimization target of a 15% EV penetration rate by 2030, 40,958 EVs will travel on the circular road network on workdays. Charging station candidate locations $CS_z^{tmc}$, $CS_z^{fc}$ are set on both sides of nodes 1-9 and on both sides of roads every 20 km, i.e., $c^{tmc} = c^{fc} = 44$. It is assumed that each TMC can carry a maximum of 3 MWh of batteries, and other parameters are listed in Table 2. To validate the effectiveness of the embodiments of the present disclosure, two scenarios are constructed, and the optimization results are compared:

Scenario 1: Obtaining an optimized scheme for the collaborative charging network based on the proposed bilevel optimization method.

Scenario 2: Determining the positions of traditional FCs according to the model proposed in reference [5], and obtaining the FC capacity scheme based on the fixed capacity model proposed in reference [6].

TABLE 2

Other Simulation Parameters

| Variable | Value | Unit | Variable | Value | Unit | Variable | Value | Unit |
|---|---|---|---|---|---|---|---|---|
| $W_{qmax}^{tmc}$ | 20 | min | $\eta_p^d$ | 1.05 | / | $c_{mt}^{tmc}$ | 1 | ¥$10^4$ |
| $W_{qmax}^{fc}$ | 30 | min | $\gamma$ | 0.8 | / | $c_{el,z}^{tmc}$ | 0.4 | ¥/kWh |
| $\alpha_z^{tmc}$ | 3 | ¥/kWh | $\delta$ | 0.5 | / | $c_{pl}^{fc}$ | 7 | ¥$10^4$ |
| $\alpha_z^{fc}$ | 1.5 | ¥/kWh | M | 20 | / | $c_{is,z}$ | 0.5 | ¥$10^4$ |
| $\varepsilon_1$ | 100 | kW | J | 10 | / | $c_{es,z}$ | 1 | ¥$10^4$ |
| $\varepsilon_2$ | 50 | kW | K | 100 | / | $c_{sl}^{fc}$ | 1 | ¥$10^4$ |
| $\upsilon$ | 7 | hours | $c_{pl}^{tmc}$ | 10 | ¥$10^4$ | $c_{mt}^{fc}$ | 0.6 | ¥$10^4$ |
| $\varphi$ | 0.04 | / | $c_{bt}$ | 140 | $/kWh | $c_{el,z}^{fc}$ | 0.8 | ¥/kWh |
| $u_1$ | $10^{-4}$ | / | $c_{tk}$ | 0.8 | $$10^4$ | $VOT^{PA}$ | 52.18 | ¥/h |
| $u_2$ | 0.01 | / | $c_{sl}^{tmc}$ | 1 | ¥$10^4$ | $VOT^{AIA}$ | 48.28 | ¥/h |

The location optimization results of scenario 1 and scenario 2 are shown in FIG. 4. It is observed that the FC location results are the same in both scenarios. Additionally, in scenario 1, the locations and service hours of 7 TMCs are obtained. TMCs at candidate sites 4, 6, 11, 13-15, and 17 are excluded due to not meeting the utilization rate constraint. The TMC depots are located at nodes 5, 10, and 12.

FIG. 5 and FIG. 6 depict a spatial-temporal distribution of charging loads and a spatial-temporal distribution of EV numbers, respectively. It can be observed that the charging load and EV number distributions of FCs in scenario 1 are more uniform than in scenario 2. The service hours for TMCs are mainly distributed between 10:00 and 21:00, evidently relieving part of the load on FCs during peak hours. Some TMCs are excluded due to lower utilization rates. It is noteworthy that TMCs at locations 3, 7, and 18 operate differently. Although TMC 18 has fewer EVs, the load is relatively high due to the higher charging capacities of users. Most EVs at TMC 3 and TMC 7 have lower charging capacities as they are close to their destinations.

Figure 7:
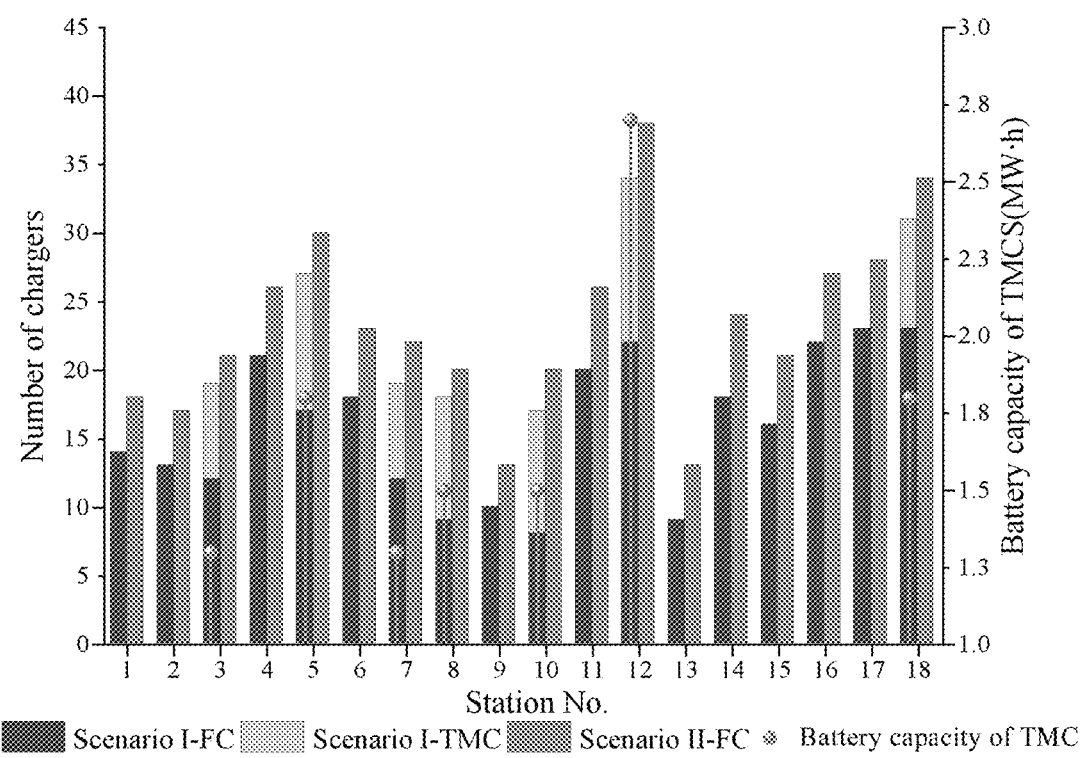
FIG. 7 is a schematic diagram of capacity configuration results for scenario 1 and scenario 2.

The capacity optimization results of scenario 1 and scenario 2 are shown in FIG. 7 and Table 3. Compared with the fixed capacity model in reference [6], the total number of charging piles in the CCO model proposed in the embodiments of the present disclosure is reduced by 72, accounting for 17.1% of scenario 2. The average queue time for FCs during peak hours in scenario 1 is approximately 10 minutes, which is acceptable for most users. Some high-VOT users will choose TMCs for charging. In scenario 2, 82 FCs with low utilization rates in 7 charging stations are replaced with 62 charging piles in 7 TMCs, increasing the average utilization rate of FCs in scenario 1 by 13.75%.

TABLE 3

Comparison of Optimization
Results between Scenario 1 and Scenario 2

| Variable | Scenario 1 | Scenario 2 | Deviation |
|---|---|---|---|
| f | FC: 18 | FC: 18 | 0 |
|  | TMC: 7 |  |  |
| $\xi_{sm}$ | FC: 287 | FC: 421 | −72 |
|  | TMC: 62 |  |  |
| Investment costs ($10^6$¥) | 46.65 | 35.79 | 10.86 |
| Average utilization rate $\rho$ (%) | $\rho^F$: 61.28 | 47.53 | 13.75 |
|  | $\rho^T$: 43.46 |  |  |
| Average queue time $W_{qm}$ (min) | $W_{qm}^F$: 10.32 | 0.83 | 9.49 |
|  | $W_{qm}^T$: 2.39 |  |  |

In the embodiments of the present disclosure, unless otherwise specified, models of various devices are not restricted, and any devices capable of performing the above functions are acceptable.

Those skilled in the art will understand that the accompanying drawings are illustrative diagrams of a preferred embodiment, and the serial numbers of the embodiments of the present disclosure are merely for description purposes and do not represent a preference of the embodiments.

The above are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A bilevel coordinated optimization method for fixed and mobile charging facilities on highways, comprising:
    constructing an optimization model framework, w % herein the optimization model framework comprises an upper-layer coordinated location optimization model and a lower-layer coordinated capacity optimization model;
    wherein the upper-layer coordinated location optimization model is used to optimize locations of charging stations and determine locations and time points of charging demands that require truck mobile charger (TMC) deployment; and
    the lower-layer coordinated capacity optimization model is used to optimize TMC and fixed charger (FC) capacities at candidate sites, improving an utilization rate of FCs; and
    performing equivalent linearization on a nonlinear problem using a big-M method and converting the problem into a mixed-integer linear programming model, and implementing a data exchange process between upper and lower layers using an analytical target cascading (ATC) technique;
    the upper-layer coordinated location optimization model comprises an electric vehicle (EV) model, an improved income approach (IIA) model, a TMC location optimization model, an FC location optimization model, and a TMC depot optimization model; and
    the EV model is as follows;
    simulations end when the following convergence condition is met or a maximum simulation count is reached, resulting in a spatial-temporal distribution of charging demands;
    wherein $P_j^L$ represents charging demands in each section of a highway network; and M and $\varepsilon_3$ are constants.

2. The bilevel coordinated optimization method according to claim 1, wherein the lower-layer model comprises a TMC capacity optimization model and an FC capacity optimization model.

3. The bilevel coordinated optimization method according to claim 1, wherein the IIA model is as follows: probabilities for TMC charging and FC charging are shown as follows:

$$P_{r\{select\ TMC\ mode\ at\ site\ z\}} = exp(c_{zi}^{fc})/\{exp(c_{zi}^{tmc}) + exp(c_{zi}^{fc})\}$$

$$P_{r\{select\ FC\ mode\ at\ site\ z\}} = exp(c_{zi}^{tmc})/\{exp(c_{zi}^{tmc}) + exp(c_{zi}^{fc})\}$$

wherein $c_{zi}^{tmc}$ and $c_{zi}^{fc}$ are costs when user i chooses TMC and FC charging at site z respectively.

4. The bilevel coordinated optimization method according to claim 1, wherein the TMC location optimization model is as follows:

$$t_{st,z}^{tmc} = \sum_{i=1}^{x_{t,z}^{tmc}} m_{ci}^{tmc} / \sum_{t=1}^{24}\sum_{i=1}^{x_{t,z}^{tmc}} m_{ci}^{tmc} \geq \varphi,\ \exists t \in [1, t_{st,z}^{tmc}]$$

$$t_{e,z}^{tmc} = \sum_{i=1}^{x_{t,z}^{tmc}} m_{ci}^{tmc} / \sum_{t=1}^{24}\sum_{i=1}^{x_{t,z}^{tmc}} m_{ci}^{tmc} \geq \varphi,\ \exists t \in [t_{e,z}^{tmc}, 24]$$

wherein $x_{t,z}^{tmc}$ represents a total number of EVs that choose TMC charging at candidate site z at time point I; $t_{st,z}^{tmc}$ and $t_{e,z}^{tmc}$ respectively represent a service start time and a service end time of a TMC; and q represents a power-weighted coefficient; and a utilization rate constraint is as follows:

$$x_z = \begin{cases} 1, & \text{if } \sum_{t=t_{st,z}^{tmc}}^{t_{e,z}^{tmc}} (\rho_{zt}^{tmc} \geq \delta) \geq \upsilon,\ \forall z \in S_c^{tmc} \\ 0, & \text{otherwise} \end{cases}$$

wherein $p_{zi}^{tmc}$ represents a utilization rate of charging station z per unit time, which is determined by the lower-layer coordinated capacity optimization model; $\delta$ represents a lower bound for the utilization rate considering the economic viability of the TMC, and u represents hours when the utilization rate is less than the lower bound; $S_c^{tmc}$ represents a set of TMC candidate sites; and $m_{ci}^{tmc}$ represents a charging quantity when $EV_1$ chooses TMC charging.

5. The bilevel coordinated optimization method according to claim 1, wherein the TMC depot optimization model is as follows: a location of a TMC depot is optimized based on a minimization of construction and operation costs:

$$minC^D = \sum_{y \in S_c^D} x_y\left\{c_{dp,y}\frac{r_0(1+r_0)^q}{(1+r_0)^q - 1}\right\} +$$

$$\sum_{y \in S_c^D} x_y(c_{sl,y}^D + c_{mt,y}^D) + D_0 \sum_{y \in S_c^D, z \in S_{c,f}^{tmc}} x_y x_{yz} c_{el,y}^{tmc}(d_{yz}C_e^{tmc} + \eta_p^d \gamma E_z^{tmc})$$

$$s.t.\ \sum_{y \in S_c^D} x_y x_{yz} = 1,\ \forall z \in S_{c,f}^{tmc}$$

$$\sum_{z \in S_{c,f}^{tmc}} x_y x_{yz} \eta_p^d \gamma E_z^{tmc} \leq E_{ymax}^D,\ \forall y \in S_c^D$$

wherein vector $x^D$ comprises Boolean variables, with $x_y=1$ when a TMC depot is set at depot y, wherein $y \in S_c^D$; otherwise, $x_y=0$; $r_G$ represents a discount rate; q represents an optimization period; vector $x_{yz}^D$ comprises Boolean variables, indicating whether a TMC at site z is assigned to depot y; and $E_{ymax}^D$ represents a capacity constraint determined by local renewable energy and power grid conditions;

Wherein $C^D$ represents construction and operation costs of the TMC depot;

$S_c^D$ represents a set of candidate TMC depot locations;

$c_{sl,y}^D$ represents employee wage costs of the TMC depot;

$c_{mt,x}^D$ represents maintenance costs of the TMC depot;

$D_0$ represents the number of operating days per year;

$S_{c,f}^{tmc}$ represents a set of TMC locations, $c_{el,y}^{tmc}$ represents electricity costs, $d_{yz}$ represents a round-trip distance from TMC z to depot y; $C_z^{tmc}$ represents energy consumption per kilometer for the TMC;

$\eta_p^d$ represents an efficiency parameter corresponding to energy loss; y represents a discharge depth considering round-trip efficiency and battery aging; $E_q^{tmc}$ represents a battery capacity of the TMC, and $x_{yz}$ is a Boolean variable, and $x_z=1$ when the TMC at site z is assigned to depot y; otherwise, $x_y=0$.

* * * * *